April 23, 1968   H. J. P. VON OHAIN ET AL   3,379,011
ENERGY EXCHANGE DEVICE AND SEPARATOR
Filed Nov. 8, 1966                  4 Sheets-Sheet 4
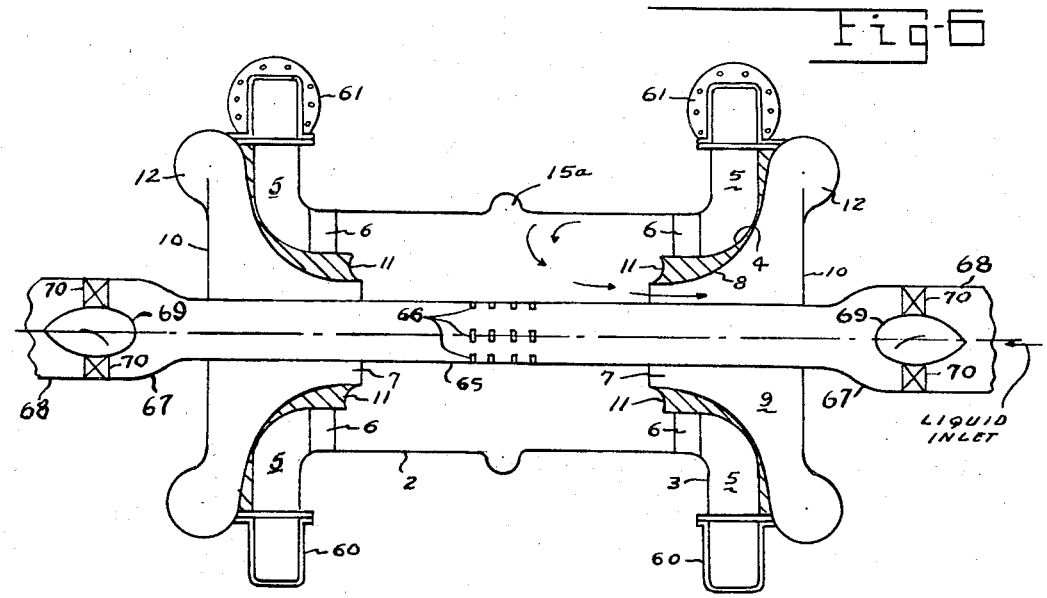
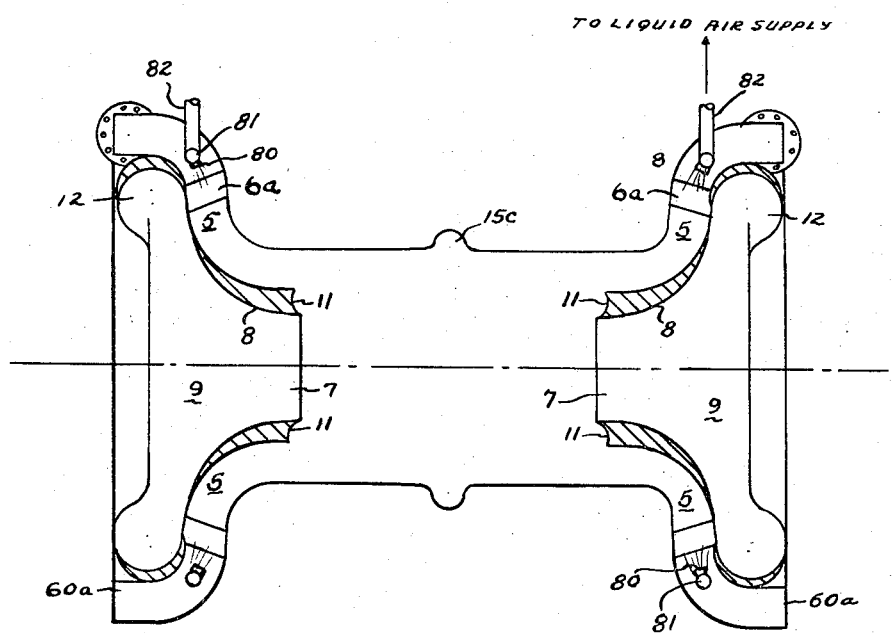
INVENTORS
HANS J. P. VON OHAIN
ROSCOE H. MILLS
BY Harry A. Herbert Jr
Raymond J. Crowley
ATTORNEYS

# United States Patent Office 3,379,011
Patented Apr. 23, 1968

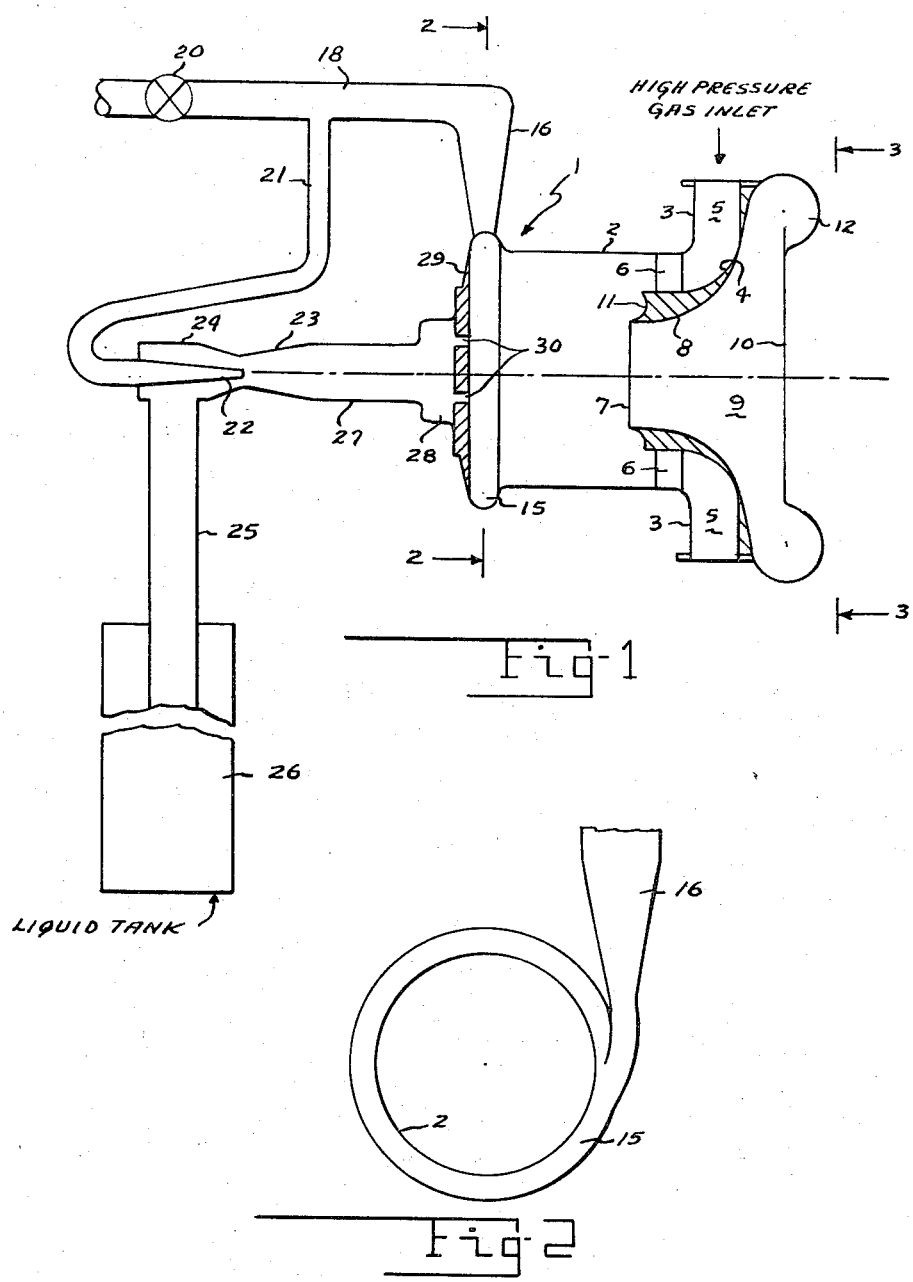

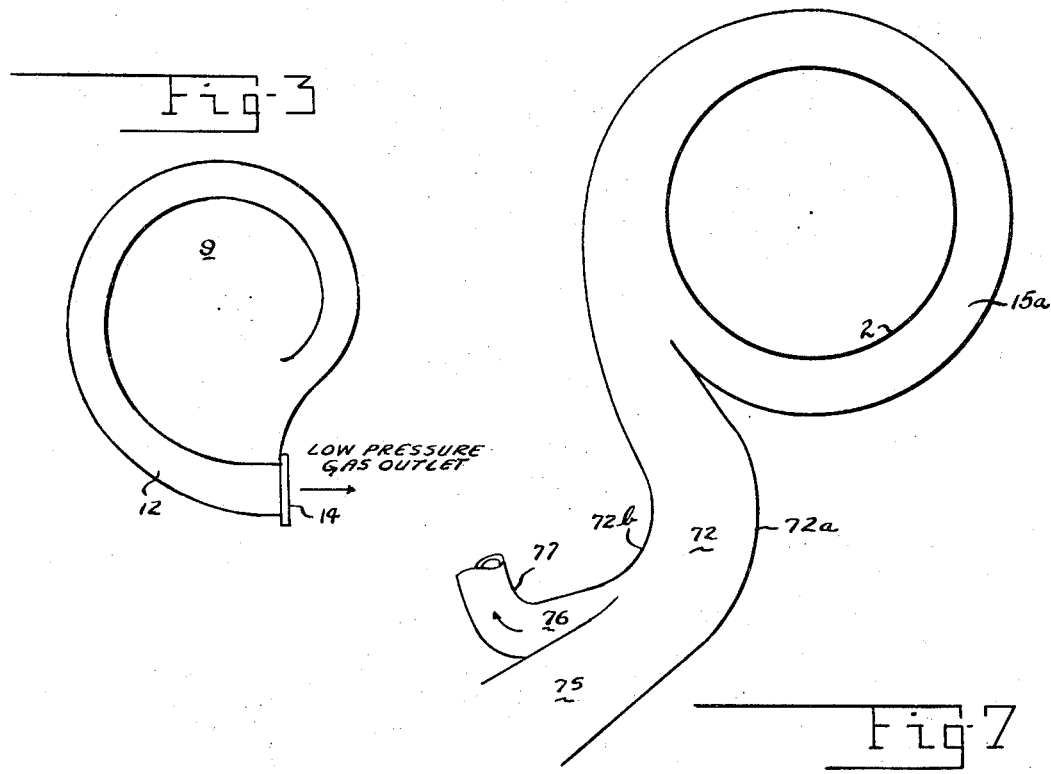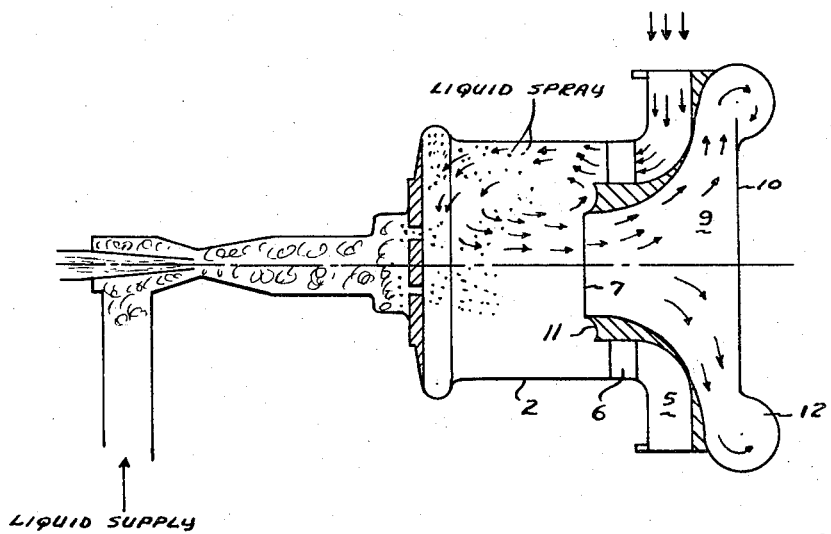

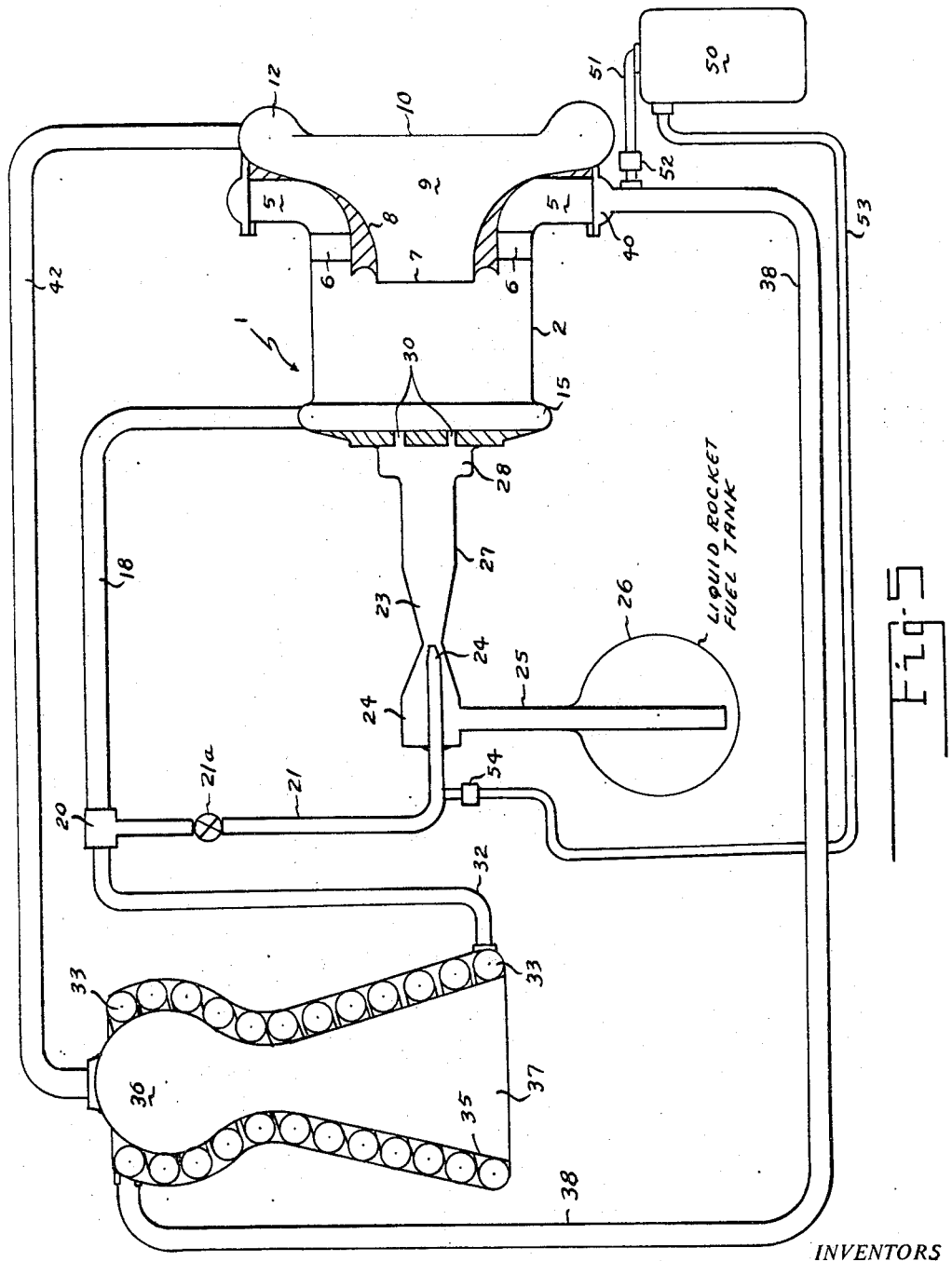

3,379,011
ENERGY EXCHANGE DEVICE AND
SEPARATOR
Hans J. P. von Ohain and Roscoe H. Mills, Dayton, Ohio, assignors to the United States of America as represented by the Secretary of the Air Force
Filed Nov. 8, 1966, Ser. No. 593,247
6 Claims. (Cl. 60—259)

ABSTRACT OF THE DISCLOSURE

In accordance with the invention, very high fluid pressure and velocity in a liquid can be generated in apparatus having no moving parts. Driver gas under high pressure and preferably at high temperature is passed into a vortex chamber casing through swirl vanes so as to create a vortex flow in the chamber with very high rotational speed in the core. The liquid is sprayed into the vortex chamber so as to be picked up by the vortex core and accelerated to rotate with the core and by centrifugal force to move radially outward to move along the chamber outer walls to a collection groove or channel where the liquid under very high pressure and or velocity or both can be withdrawn. In one form of the apparatus, cryogenic liquids such as liquid air can be accelerated to very high velocity by using a high pressure, high temperature, low molecular weight driver gas to obtain stagnation pressures and temperatures in a hypersonic wind tunnel connected to the pump, far beyond those attainable with conventional apparatus.

---

The invention described herein may be manufactured and used by or for the United States Government for governmental purposes without payment to use of any royalty thereon.

This invention relates to a device whereby energy confined in a gas under high pressure may be transferred to a fluid causing the fluid to acquire rotational energy which can be converted into high pressure. The fluid after acquiring energy from the high pressure gas stream is separated therefrom. The device in essence is the equivalent of a pump without any moving parts.

A device in accordance with the invention consists primarily of a means for converting a high pressure gas flow into a vortex and spraying the liquid to be energized into the vortex stream. The extremely high velocity rotation of the vortex at its core will entrain the fluid particles and cause the same to rotate with the core. The liquid particles being present in a field of extremely high centrifugal force will move radially outward and be carried longitudinally by the meridian flow in a chamber enclosing the vortex. The fluid particles will tend to collect in a suitable channel arranged radially outward from the vortex chamber and because of the intense rotational velocity thereof can exert extremely high pressure. The rotational velocity head can further be converted to pressure through a conventional diffuser. The liquid discharge from the device will be free from gas, bubbles and the like and when the meridian flow reaches the end of the vortex chamber, it will turn inwardly and move axially in the reverse direction from its inlet flow and can then be discharged at a lower pressure through a central opening in the vortex chamber. The rotational component of the gas discharged from the vortex chamber can be converted to pressure in a conventional scroll-type diffuser through which the discharge gas can flow.

A device of the character to which the invention refers has many uses in different types of pumping systems and wherever it is desirable to place a liquid under very high pressure without the necessity of employing rotational pumping machinery. The invention is applicable as a pump in a liquid rocket fuel system but may be employed in any case where it is desirable to convert pressure energy in a gas into pressure energy in a liquid of greater density than the gas.

Apparatus in accordance with the invention is also eminently suitable as a driving means for a hypersonic wind tunnel wherein by employing a low molecular gas such as hydrogen or helium under high pressure and high temperature as the driver gas, phenomenal velocities in the vortex can be achieved and by spraying a cryogenic liquid such as liquid air into the vortex, it is possible to cause the liquid particles to achieve rotational speeds far beyond any speed possible with mechanical pumping equipment. The high velocity liquid air particles are collected and the extremely high pressure and high velocity gas is allowed to expand in a hypersonic nozzle forming part of a wind tunnel. With such equipment, it will be possible to achieve stagnation pressures and temperatures far beyond those attainable in conventional apparatus.

One form of the invention is disclosed in FIGS. 1 to 3 of the drawings, in which FIG. 1 is a schematic longitudinal sectional view of apparatus in accordance with the invention.

FIG. 2 is a transverse sectional view taken on line 2—2 of FIG. 1.

FIG. 3 is a transverse end view taken on line 3—3 of FIG. 1.

FIG. 4 is a fragmentary view of the apparatus of FIG. 1, illustrating the meridian flow within the vortex chamber.

FIG. 5 is a longitudinal sectional sketch illustrating the use of the device of FIG. 1 in a monopropellant fuel system.

FIG. 6 is a longitudinal sectional view of apparatus suitable for use with a hypersonic wind tunnel or other utilization device.

FIG. 7 is a view in section taken on line 7—7 of FIG. 6; and

FIG. 8 is a longitudinal sectional view of a device similar to that of FIG. 6 except that the cryogenic liquid is sprayed directly into the driver gas inlet.

Referring now to FIG. 1, an energy exchanger in accordance with the invention is generally indicated by the reference numeral 1 and includes a tubular metal body member 2 having radially extending walls 3 at one end which cooperate with trumpet-shaped walls 4 to define a generally radially extending annular inlet chamber 5. At its lower end, the inlet chamber 5 is turned to the axial direction and flow therefrom passes through axially extending swirl vanes 6 secured to the trumpet-shaped wall member 4 and to the cylindrical casing 2. The casing 2 is provided with a central discharge opening 7 formed by trumpet-shaped annular wall member 8 spaced from the similar shaped wall member 4 and the opening 7 discharging into a diffusing chamber 9 which is bounded at its outer end by a circular radially extending wall 10 causing the flow to move radially into a conventional scroll-type diffuser 12 provided with an outlet conduit such as at 14 (note FIG. 3).

At their inner ends, the trumpet-shaped wall members 4 and 8 are joined by a curved wall member 11 which serves as a guide surface to guide the meridian return flow which does not pass out through the discharge opening (note FIG. 4).

At the left end of FIG. 1, the cylindrical chamber 2, which is made of sheet metal or the like, is formed with an enlarged radially extending circumferential bead which encloses a radially extending groove or chamber 15 communicating with the interior of the housing 2. The groove or chamber 15 serves as a collector for liquid under pressure and communicates, as seen in FIG. 2, with a conventional diffuser section 16, which connects to a high pressure fluid line 18 receiving the discharge from the diffuser 16. The conduit 18 can be provided with a conventional control and shut-off valve 20. On the upstream side of the valve 20, the conduit 18 communicates with a small bypass conduit 21 which can bleed a small quantity of high pressure fluid from the conduit 18 and cause the same to be discharged under very high velocity from a nozzle 22 positioned at the throat of a venturi tube section 23 which at its inner end communicates with an annular chamber 24 connected by means of a conduit 25 to a liquid tank 26 adapted to be supercharged at its upper end with a gas under pressure to provide sufficient pressure head to drive the liquid from the tank to the chamber 24 whereby the suction produced by fluid flow from nozzle 22 through the venturi 23 aspirates liquid from the chamber 24 to be entrained with a high velocity discharge from the nozzle 22. The discharge from the aspirator pump elements 22 through 26 inclusive passes from the venturi 23 into a conduit 27 communicating with a collector chamber 28. The chamber 28 is secured to a metal end wall 29 of the housing 2 and the latter being pierced by a number of small drilled passages 30 communicating with the chamber 28 and permitting fluid under pressure to spray from the drilled passages 30 into the vortex chamber formed by housing 2.

The device of FIG. 1 operates as follows. With particular reference to FIG. 4, gas under high pressure from a suitable source such as a container charged with hydrogen, air or the like, under pressure of 3,000 lbs./sq. in. is admitted into the radial inlet passage 5 of the device 1 of FIG. 1. The gas will flow with high velocity through the inlet passage 5 and through the axial swirl vanes 6 which will impart a rotational component to the axially flowing gas stream. The gas stream after passing the swirl vanes 6 passes into the vortex chamber formed by the cylindrical housing 2 and will form a natural vortex therein such that the rotational velocity will increase radially towards the central axis of the chamber 2 with a core rotating at extremely high velocity and with very low pressure. The center portions of the stationary wall members 10 and 29 of FIG. 1 are contacted by the core of the natural vortex and serve as means for anchoring the spin axis of the vortex flow. This ensures that the vortex follows Helmholtze's law that the vorticity along the spin axis is constant, i.e., the static pressure is substantially constant along the spin axis and ensures that the vortex flow will be stable and will allow much higher vortex core spin velocities. The actual meridian flow tends to move radially outward somewhat after leaving the swirl vanes 6 and moves axially downstream along the outer walls of the vortex chamber 2 all of the while spinning in a plane at right angles to the meridian flow. As the gas flow approaches the end of the vortex chamber 2, it begins to lose energy and its meridian component turns inward toward the central axis as indicated in FIG. 4. The gas flow then reverses direction and while rotating at high velocity moves axially upstream towards the discharge opening 7. While the gas flow above described is taking place, liquid is being supplied from the orifices 30 into the gas stream, penetrating the same axially in the form of liquid drops. The small drops of fluid will be entrained into the extremely high rotational velocity of the gas core and the rotational velocity will be imparted to the fluid particles at the expense of the kinetic energy of the driver gas. The fluid particles will tend to move towards the discharge opening 7 but, because they are subjected to an extremely high centrifugal force field, will move radially outward towards the walls of the chamber 2 and will be carried by meridian flow to the fluid discharge chamber 15 where the drops will collect as solid fluid under high pressure with a further rotational component retained therein. Fluid under pressure discharged from the groove 15 is passed into the diffuser section 16 and ultimately is delivered as fluid under very high pressure in the outlet conduit 18. Fluid under high pressure delivered to the conduit 18 can move downstream through the control valve 20 to be utilized for any desirable purpose. As previously described, a small quantity of fluid bypassed through the conduit 20 is used to aspirate liquid from the supply tank 20 to deliver the same into the energy exchange system.

The axially moving core of the driver gas vortex in the chamber 2 moving axially upstream towards the inlet 7 passes into the diffuser chamber 9 where it radially expands and ultimately enters the single scroll diffuser 12 to be ultimately discharged at the outlet 14 (FIG. 3).

The device of FIG. 1, while indicated as employing axial swirl vanes 6 may, if so desired, employ radial swirl vanes positioned in the inlet 5 at the entrance thereto. With such an arrangement, all of the vanes may be connected by means of a ring gear and pinion for simultaneous angular adjustment, if so desired. With such an arrangement, the swirl component of the inflowing high pressure gas may be adjusted over a considerable range. Due to the fact that adjustable inlet swirl vanes of the type just described, per se, are well known, no illustration of the same is believed to be necessary.

FIG. 5 illustrates the application of the energy exchanger device of FIG. 1 for use in a rocket fuel system. As seen in this figure, a pumping device generally indicated by the reference numeral 1 identical to that illustrated in FIG. 1 and previously described, is provided with a rocket fuel tank indicated at 26 which may contain, for example, a monopropellant fuel, a number of types of which are well known and constituting in itself both a fuel and an oxidizer. In this system, the high pressure liquid line 18 is adapted to collect liquid fuel from the collector groove 15 and which is delivered with very high pressure from conduit 18 and control valve 20 into a conduit 32 which connects to a spiral wound conduit 33 contacting the walls 35 of a rocket motor generally indicated at 36 and the fuel under pressure circulating through the spiral conduit 33 absorbs heat from the rocket chamber to prevent a burn out thereof in a manner well known in the art. In its passages upward from the lower end of the nozzle 37 of the rocket motor to the combustion chamber thereof, the fuel is heated and becomes vaporized and is delivered into the conduit 38 as gas under high pressure and pressure which is delivered into an annular inlet 40 connected to the annular passage 5 of the pumping device 1. Liquid fuel from the tank 26 is drawn into the pipe 25 by aspirator action of a nozzle 22 and venturi aspirator pump parts 23 and 24. A portion of the high pressure fuel from conduit 18 is bypassed through a control valve 21a and conduit 21 to supply the aspirator nozzle 22 with high pressure liquid in the manner previously noted to withdraw fuel from the tank 26. Fuel under pressure is then transferred by means of conduit 27 and space 28 to the supply orifices 30 whereby the liquid fuel is sprayed into the interior of the vortex chamber 2 to be mixed with the gas from inlet 5 which is converted by the swirl vanes 6 into a cyclonic gas flow within the vortex chamber 1. The fluid droplets sprayed from the nozzles 30 ultimately are centrifuged by the rotating gas in the vortex chamber 1 to ultimately collect as liquid fuel in the collector chamber 15 under high pressure in the manner previously described with the operation of the device of FIG. 1.

Gas flowing axially to the left in the vortex chamber 2 ultimately reverses its direction and flows out through the inlet opening 7 to the diffuser chamber 9 from whence same enters the scroll-type diffuser 12 ultimately appearing as gas under pressure in the conduit 42 which leads the gaseous fuel to the combustion chamber of the rocket motor 36 where the same is ignited by means not shown and burned. In order to start the system, a small fuel supply tank 50 is provided which may, in effect, be a fuel boiler and when suitably heated will deliver gaseous fuel under pressure through conduit 51 and check valve 52 into the annular intake 40 to deliver gaseous fuel to the inlet 5 of the pumping device 1. Also, liquid fuel under pressure is delivered from the boiler 50 by way of conduit 53 and check valve 54 into the conduit 21 so as to spray a sufficient initial quantity of liquid fuel to the aspirator nozzle 22 so as to withdraw sufficient fuel from the tank 26 to cause fuel to be supplied from the nozzles 30 into the vortex chamber 2. Once sufficient gas and liquid pass into the vortex chamber, the system thereafter becomes self-sustaining in operation. The beauty of the system illustrated in FIG. 5 lies in the fact that very high rotational velocities and hence pressures can be imparted into a liquid without utilizing any rotating machine elements and the overall simplicity of the system is obvious.

In the form of the invention as illustrated in FIG. 6, the structure in effect involves an arrangement of two of the devices of FIG. 1 arranged back to back as a single entity. Parts corresponding to the parts of FIG. 1 are given the same reference numerals. The device of FIG. 6 has only a single liquid collecting channel indicated as 15a and positioned at the vertical plane of symmetry.

The annular inlet channels 5 at each end of the vortex chamber housing 2 are adapted to be connected to an annular manifold 60 in turn adapted to be connected by means of a flanged connection 61 to a lateral conduit (not shown). The lateral conduit is adapted to supply a low molecular weight gas such as helium or hydrogen from a suitable source under pressure of 3,000 or more pounds per square inch and temperature of the order of 1,000° F. or higher to the inlet channels 5. A central conduit 65 concentric with the longitudinal center line of the housing 2 passes through the end walls 10 and adjacent the central zone of the vortex chamber is perforated with a plurality of narrow slots 66 equally circumferentially spaced around the conduit 65. The slots 66 serve as spray nozzles for introducing drops of a cryogenic liquid into the vortex chamber. The conduit 65 just beyond each of the walls is flared outward as at 67 and joined to a larger conduit section 68 which is adapted to be connected to a suitable supply of cryogenic liquid, not shown. Within the end portions of the conduit sections 68 is a streamlined body member 69 adapted to support a plurality of swirl vanes 70 which extend radially outward to the wall of conduit 68. The swirl vanes 70 are pitched to have the same swirl direction of rotation as the inlet swirl vanes 6 and insure that drops of cryogenic liquid sprayed from the orifice like slots 66 will have a rotation in the proper direction to have a shock free entrance into the vortex flow.

As seen in FIG. 7, the liquid collection scroll 15a gradually enlarges into a sharply curved section 7a, the purpose for which is to further separate vaporized liquid air from helium driver gas. In the collection scroll 15a, the velocity of the liquid air is very high along with the pressure and due to friction on the collector walls, the liquid air is vaporized to some extent and this vapor tends to block any ingress of helium from the vortex chamber. When passing into the curved wall section, the liquid air vapor due to its higher density is thrown toward the wall 72a by high centrifugal force and helium that may have passed over is forced inward to move along the outer wall 72b. The curved separator section 72 is connected to the inlet of a hypersonic nozzle 75 which has an inlet smaller in diameter than the outlet of the separator section 72 leaving a space 76 adjacent the inner wall 72b for escape of helium centrifuged out from the liquid air vapor admitted to be connected to a helium return conduit 77 leading to an exhaust gas collecting source not shown.

The operation of the device of FIG. 6 is essentially the same as that of FIG. 1. Helium or other low molecular weight gas under high pressure of the order of 3,000 p.s.i. and a temperature of 1000° F. is allowed to enter the manifolds 60 from a suitable source, not shown. The high pressure gas will then enter the curved annular inlets 5 at each end of the vortex chamber casing 2 and will have a rotational component impressed thereon by passage through the swirl vanes 6. The swirling, high temperature, high pressure, low molecular weight gas will form a natural vortex flow in the housing 2 so that the velocity will vary inversely as the radius with the velocity at the core being extremely high with the static pressure very low while adjacent the chamber walls 2 the static pressure is high and the velocity relatively low. The spin velocity of the vortex core can reach phenomenal values which at Mach numbers of three or higher may exceed 30,000 feet per second. The meridian flow from each end of the housing 2 will be similar to that of FIG. 4 and the spiralling flow moving upstream toward outlet 7 and expansion chamber 9 will pick up droplets of liquid air discharged from the slots 66 of the conduit 65. Because the droplets have an initial spin they will be readily picked up in the vortex flow and acquire the velocity thereof at the expense of the kinetic energy of the driver gas. The liquid air droplets will be centrifuged outward toward the walls of the housing 2 and be carried downstream from each end toward the central vertical plane of symmetry where the liquid will be collected in the scroll 15a. Because of its very high velocity, the liquid air collected in the scroll 15a will tend to vaporize due to friction with the walls of the collector scroll and because of its high density gaseous helium will be crowded out by the vapor. The vaporized liquid air passes from the collecting scroll 15a (FIG. 7) into the sharply curved section 72 where passage around the curved wall 72a will, due to centrifugal force, cause any entrained helium to be forced toward the wall 72b to pass out into the passage 76 to be led back for collection with the helium or other low molecular weight driver gas. The vaporized liquid air will be further vaporized by friction with the walls 72a and will enter the hypersonic nozzle 75 as a gas for further expansion. The nozzle 75 may be part of a wind tunnel in which models may be exposed to conditions simulating re-entry conditions from outer space in that because of the velocities attained, stagnation pressure and temperature may be attained which would simulate re-entry conditions. Because of the velocity and pressure of the air on entrance into the hypersonic nozzle velocity can be acquired in the nozzle far beyond any available with conventional equipment. Stagnation temperatures and pressures far beyond those now attained can be achieved. Assuming 100% interchange of energy, the stagnation temperature for air $$T_{tot} = T_{tot} \text{ for helium} \times \frac{\text{molecular weight of air}}{\text{molecular weight of helium}}$$

and may be as high as 30,000° K.

In the device of FIG. 6 the conduit 65 extending throughout the length of the vortex chamber serves as a means for stabilizing the vortex flow which in effect becomes a bound vortex. At first sight, it would appear that the conduit 65 would create excessive friction with contact with the core of the vortex. In fact, however, this is not so because the major spin velocity will occur in the vortex radially outward from the conduit and contact with the heavier droplets of liquid air will cause a rapid drop in energy level of the helium. The energy level of the meridian flow as it approaches the central plane of symmetary is relatively low and the velocity of the inturning spiral of the core which moves upstream to the outlets 7 is relatively low and the friction with conduit 65 is not high.

The device of FIG. 8 is essentially the same as the device of FIGS. 6 and 7. The only difference resides in the fact that a plurality of spray nozzles 80 are formed in a ring-shaped conduit 81 and arranged in parallel circumferentially spaced about each of the inlets 5 of a pumping apparatus similar to that of FIG. 6. The spray nozzles 80 are all adapted to be connected by means of a conduit 82 to a source of supply of liquid air or other liquefied gas of high molecular weight (not shown). The nozzles 80 are adapted to spray the liquid air into a stream of helium under high pressure and at high temperature delivered by way of manifolds 60a to the inlets 5. The spray nozzles 80 are positioned just before the swirl vanes 6a which are arranged for radial flow in lieu of the axial arrangement of FIG. 6.

In the device of FIG. 8, the collecting scroll 15a is identical to that of FIGS. 6 and 7 and is adapted to be connected to separator sections 72 and 76 and to a hypersonic nozzle 75 of a wind tunnel in the same manner as illustrated in FIG. 7.

We claim:

1. In an energy exchange device of the character described, a cylindrical housing defining an elongated vortex chamber, means operatively associated with said housing providing for the inlet of a gas under high pressure at one end of said vortex chamber with a rotational component to initiate a vortex flow in said chamber, stationary means within the vortex chamber to stabilize the rotation of the vortex core, a gas outlet within the housing concentric with the longitudinal axis thereof and surrounded by said inlet means, an expansion chamber diffuser concentric with said outlet and forming a continuation thereof, a means for spraying a liquid into said vortex chamber so as to be entrained in the core of the vortex flow and to absorb kinetic energy from the rotation of the gas core of the vortex flow, said liquid spray droplets being centrifuged from the vortex core outward to the vortex chamber walls and to be carried downstream by the meridian flow in the vortex chamber, a ring channel communicating interiorly with said vortex chamber in a zone of major radius thereof and adapted to collect and discharge the high pressure liquid droplets carried thereto by the meridian component of the vortex flow.

2. A device as claimed in claim 1, including a conduit for carrying away the high pressure liquid collected in said ring channel, a liquid supply source, an aspirator pump connected to said supply source and adapted to deliver liquid under pressure to the means for spraying liquid into said vortex chamber and a bypass connection between said conduit and said aspirator pump to energize the same.

3. In a rocket engine fuel pumping system wherein the rocket engine combustion chamber walls are provided with a spiral passage for fuel and having an inlet for liquid fuel adapted to be vaporized by heat exchange from the rocket combustion chamber and having an outlet for vaporized fuel; the improvement which comprises a vortex chamber having an annular inlet passage with means for inducing a swirl in gas passed therethrough, a connection between the outlet for vaporized fuel and said vortex chamber inlet, a liquid fuel supply tank, spray means for spraying liquid fuel droplets into said vortex chamber, means including an aspirator pump connecting said fuel supply tank and said spray means, means in said vortex chamber for collecting and discharging liquid fuel under high pressure centrifuged out from the vortex flow in said vortex chamber, a conduit connecting the means for collecting and discharging liquid fuel from the vortex chamber and the inlet of the spiral passage in the rocket engine combustion chamber, a bypass connection between said last-named conduit and said aspirator pump to energize the same, a gas outlet in said vortex chamber, a diffuser connected to said gas outlet, a conduit connecting said diffuser and said rocket engine combustion chamber for delivering vaporized fuel thereto, a starting fuel boiler and connections from said boiler to the vortex chamber inlet and to said aspirator pump for delivering a starting supply of fuel vapor thereto.

4. Apparatus for delivering air at high velocity to a hypersonic wind tunnel comprising a cylindrical casing forming an elongated vortex chamber, means forming inlet passages to each end of said vortex chamber, vanes in said inlet passages to induce a rotation in the gas passing through the inlet passages and initiate a vortex flow in said vortex chamber proceeding from each end toward the central plane of symmetry, means for connecting each inlet passage to a source of low molecular weight driver gas such as helium at high temperature and pressure, spray means adapted to be connected to a supply of liquid air and to spray the liquid air into the core of the vortex flow in the vortex chamber, a central driver gas outlet at each end of the vortex chamber, a channel formed in said vortex chamber casing substantially equidistant from the ends thereof and adapted to collect liquid air centrifuged from the vortex and carried by the meridian component of the vortex flow to said channel, a curved conduit connected to said channel with the curvature adapted to centrifuge the vaporized liquid air against one wall of the conduit and any entrained driver gas toward the other wall, said curved conduit being split into a pair of outlets, a scavenging conduit connected to one of said curved conduit outlets to carry away separated driver gas and a connection between the other of said curved conduit outlets and a hypersonic expansion nozzle forming part of the hypersonic wind tunnel assembly.

5. Apparatus for accelerating an air stream to hypersonic velocity comprising a housing defining a vortex chamber, means for admitting a low molecular weight driver gas under high temperature and pressure to said vortex chamber with a spin component to initiate a vortex flow in said vortex chamber, means for spraying liquid air into said vortex flow to absorb kinetic energy from the vortex rotation of said driver gas, means in said vortex chamber providing a stationary anchorage for the spin axis of the vortex flow of the driver gas, a diffuser for expanding and decelerating flow from the core of the vortex and having an inlet in communication with the vortex chamber, a collection channel in said vortex chamber for collecting droplets of liquid air centrifuged out from said vortex flow and a nozzle connected to said channel for expanding the air to hypersonic velocity.

6. Apparatus for exchanging energy from a driver gas under high pressure to a liquid comprising a housing defining a vortex chamber, means forming an inlet to said housing and vortex chamber, said inlet being adapted to be connected to a source of driver gas under high pressure, means in said inlet for inducing a spin component in the stream of driver gas flowing through said inlet to thereby initiate a vortex flow in said vortex chamber, spray means for spraying liquid into the vortex flow in said vortex chamber, the vortex rotation transferring energy from the driver gas to the fluid droplets, a diffuser aligned axially with the vortex spin axis and having an inlet extending into the vortex core to receive driver gas flow moving axially opposite the direction of the inflow of driver gas, a collection means in said vortex chamber adjacent the maximum radius thereof adapted to collect liquid droplets centrifuged out of the driver gas vortex flow in the vortex chamber and a conduit connected to said collecting means for removing liquid under high pressure to the exterior of said vortex chamber housing.

References Cited

UNITED STATES PATENTS 2,612,752  10/1952  Goddard.
3,041,010  6/1962  Foster _____ 230—95
3,134,338  5/1964  Dodge _____ 230—95

CARLTON R. CROYLE, *Primary Examiner.*

D. HART, *Assistant Examiner.*